US011469945B2

(12) United States Patent
Yerramalli et al.

(10) Patent No.: US 11,469,945 B2
(45) Date of Patent: Oct. 11, 2022

(54) DYNAMIC BANDWIDTH CONFIGURATION IN NARROWBAND COMMUNICATION

(71) Applicant: QUALCOMM Incorporated, San Diego, CA (US)

(72) Inventors: Srinivas Yerramalli, San Diego, CA (US); Chih-Hao Liu, San Diego, CA (US); Tamer Kadous, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 19 days.

(21) Appl. No.: 15/847,737

(22) Filed: Dec. 19, 2017

(65) Prior Publication Data

US 2018/0287870 A1 Oct. 4, 2018

Related U.S. Application Data

(60) Provisional application No. 62/481,056, filed on Apr. 3, 2017.

(51) Int. Cl.
H04L 12/24 (2006.01)
H04W 72/04 (2009.01)
(Continued)

(52) U.S. Cl.
CPC ........ *H04L 41/0816* (2013.01); *H04L 5/0053* (2013.01); *H04L 5/0064* (2013.01);
(Continued)

(58) Field of Classification Search
None
See application file for complete search history.

(56) References Cited

U.S. PATENT DOCUMENTS 6,018,659 A * 1/2000 Ayyagari ........... H04B 7/18504
342/450
7,412,516 B1 * 8/2008 Brown ................ H04L 41/0806
709/224
(Continued)

FOREIGN PATENT DOCUMENTS

WO WO-2014112916 A1 * 7/2014 ............. H04L 5/005

OTHER PUBLICATIONS

Huawei, et al: "Bandwidth Adaptation and Scalable Design in NR," 3GPP Draft; R1-1701644, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 6, 2017, XP051220526, 5 pages, Retrieved from the Internet: URL: http://www.3gpp.org/ftp/tsg_ran/WG1_RL1/TSGR1_88/Docs/ [retrieved on Feb. 6, 2017].
(Continued)

*Primary Examiner* — Ajit Patel
*Assistant Examiner* — Rodrick Mak
(74) *Attorney, Agent, or Firm* — Arent Fox, LLP

(57) ABSTRACT

In order to conserve power resources for low complexity UEs, a base station may apparatus dynamically adjust a bandwidth configuration of a UE or the base station and communicates with the UE according to the dynamically adjusted bandwidth configuration. The communication may be narrowband communication. A UE may apparatus dynamically adjust a bandwidth configuration of the UE and communicates with a base station based on the dynamically adjusted bandwidth configuration. The dynamically adjusted bandwidth configuration may correspond to a function performed by the UE.

32 Claims, 11 Drawing Sheets

(51) Int. Cl.
*H04W 28/20* (2009.01)
*H04L 5/00* (2006.01)
*H04W 88/08* (2009.01)
*H04W 88/02* (2009.01)
*H04W 4/02* (2018.01)
*H04L 41/0816* (2022.01)
*H04L 41/0896* (2022.01)

(52) U.S. Cl.
CPC ......... *H04L 41/0896* (2013.01); *H04W 28/20* (2013.01); *H04W 72/04* (2013.01); *H04L 5/0044* (2013.01); *H04L 5/0048* (2013.01); *H04L 5/0051* (2013.01); *H04L 5/0094* (2013.01); *H04W 4/02* (2013.01); *H04W 88/02* (2013.01); *H04W 88/08* (2013.01); *Y02D 30/70* (2020.08)

(56) References Cited

U.S. PATENT DOCUMENTS

| | | | | |
|---|---|---|---|---|
| 8,019,303 | B2* | 9/2011 | Liu | H04L 27/2602 370/395.41 |
| 9,485,697 | B1* | 11/2016 | Wang | H04W 76/18 |
| 10,277,669 | B1* | 4/2019 | Joliveau | H04L 65/4084 |
| 2008/0117869 | A1* | 5/2008 | Freen | H04W 28/16 370/329 |
| 2009/0243932 | A1* | 10/2009 | Moshfeghi | G01S 13/38 342/378 |
| 2009/0290549 | A1* | 11/2009 | Tiirola | H04L 5/0053 370/329 |
| 2012/0020320 | A1* | 1/2012 | Issakov | G01S 5/06 370/330 |
| 2013/0121268 | A1* | 5/2013 | Li | H04W 72/04 370/329 |
| 2014/0011506 | A1* | 1/2014 | McNamara | H04L 5/0039 455/450 |
| 2014/0094165 | A1* | 4/2014 | Karlsson | H04W 16/14 455/423 |
| 2014/0198676 | A1* | 7/2014 | Han | H04W 24/10 370/252 |
| 2015/0208382 | A1* | 7/2015 | Yao | H04W 72/0446 370/280 |
| 2016/0025500 | A1* | 1/2016 | Hoffberg | H04W 4/024 701/423 |
| 2016/0080133 | A1* | 3/2016 | Golitschek Edler von Elbwart | H04W 72/0446 370/280 |
| 2017/0135070 | A1* | 5/2017 | Huber | H04W 72/04 |
| 2017/0280296 | A1* | 9/2017 | Divakaran | H04W 4/025 |
| 2017/0339677 | A1* | 11/2017 | Rico Alvarino | H04L 5/0094 |
| 2018/0192434 | A1* | 7/2018 | Lee | H04L 5/00 |
| 2019/0124558 | A1* | 4/2019 | Ang | H04L 5/001 |
| 2020/0280962 | A1* | 9/2020 | Li | H04L 5/0094 |
| 2021/0006372 | A1* | 1/2021 | Cha | H04L 5/0091 |

OTHER PUBLICATIONS

Interdigital Communications: "Bandwidth Adaptation in NR," 3GPP Draft; R1-1702382, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 13, 2017-Jan. 17, 2017, Feb. 12, 2017, XP051209536, 5 pages, Retrieved from the Internet: URL: http://www.3gpp.org/ftp/Meetings_3GPP_SYNC/RAN1/Docs/ [retrieved on Feb. 12, 2017].
International Search Report and Written Opinion—PCT/US2018/020715—ISA/EPO—dated Jun. 13, 2018.
QUALCOMM Incorporated: "Adaptive Bandwidth for Control and Data," 3GPP Draft; R1-1612070_ADAPTIVE_BW_FOR_CONTROL_AND_DATA, 3rd Generation Partnership Project (3GPP), Mobile Competence Centre; 650, Route Des Lucioles; F-06921 Sophia-Antipolis Cedex; France, vol. RAN WG1, No. Reno, Nevada, USA; Nov. 14, 2016-Nov. 18, 2016, Nov. 13, 2016, XP051176030, 5 pages, Retrieved from the Internet: URL: http://www.3gpp.org/ftp/Meetings_3GPP_SYNC/RAN1/Docs/ [retrieved on Nov. 13, 2016].
"3rd Generation Partnership Project, Technical Specification Group Radio Access Network, Evolved Universal Terrestrial Radio Access (E-UTRA), Physical layer Measurements (Release 11)", 3GPP Standard, 3GPP TS 36.214 version 11.1.0 Release 11.

* cited by examiner

DYNAMIC BANDWIDTH CONFIGURATION IN NARROWBAND COMMUNICATION

CROSS-REFERENCE TO RELATED APPLICATION

This application claims the benefit of U.S. Provisional Application Ser. No. 62/481,056, entitled "Dynamic Bandwidth Configuration in Narrowband Communication" and filed on Apr. 3, 2017, which is expressly incorporated by reference herein in its entirety.

BACKGROUND

Field

The present disclosure relates generally to communication systems, and more particularly, to adjustment of a bandwidth configuration for a user equipment (UE) or a base station in narrowband communication.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

It may be desirable to support low complexity, low rate communication devices. Such communication may involve a reduction in a maximum bandwidth, e.g., a narrowband bandwidth, use of a single receive radio frequency (RF) chain, a reduction in peak rate, a reduction in transmit power, the performance of half duplex operation, etc. One example of such narrowband wireless communication is Narrowband-Internet of Things (NB-IoT), which may be limited to a single RB of system bandwidth, e.g., 180 kHz. Another example of narrowband wireless communication is enhanced machine type communication (eMTC), which may be limited to six RBs of system bandwidth.

Narrowband wireless communication involves unique challenges due to the limited frequency dimension of the narrow band. Additionally, low power operation may be very important for such low complexity devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In order to address the unique communication needs of narrowband communication devices and to conserve power resources for low complexity UEs, bandwidth for a UE and/or bandwidth for a base station may be adjusted, e.g., dynamically adjusted.

In an aspect of the disclosure, a method, a computer-readable medium, and an apparatus are provided for wireless communication at a UE. The communication may comprise narrowband communication, e.g., NB-IoT, eMTC, etc. The apparatus adjusts a bandwidth configuration of the UE and communicates with a base station based on the adjusted bandwidth configuration. In an aspect, the apparatus may receive an indication from the base station, wherein the bandwidth configuration of the UE may be adjusted based on the indication received from the base station. The bandwidth configuration may be adjusted based on a function performed by the UE, e.g., corresponding to any of positioning, mobility, voice over long term evolution (VoLTE), radio link monitoring (RLM), Sounding Reference Signal (SRS) transmission, random access, data transmissions, etc. In another aspect, the bandwidth configuration may be adjusted based on a reconfiguration determined at the UE.

In an aspect of the disclosure, a method, a computer-readable medium, and an apparatus are provided for wireless communication at a base station. The communication may be narrowband communication, e.g., NB-IoT, eMTC, etc. The apparatus adjusts a bandwidth configuration of a UE or the base station and communicates with the UE according to the adjusted bandwidth configuration. The apparatus may adjust a bandwidth configuration of the UE based on a function performed by the UE, e.g., corresponding to any of positioning, mobility, VoLTE, RLM, SRS transmission, random access, data transmissions, etc. The apparatus may adjust the bandwidth configuration of the base station based on any of a need for an increase in capacity, a need for improved accuracy of measurements, an application of the communication, or a group of UEs served by the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
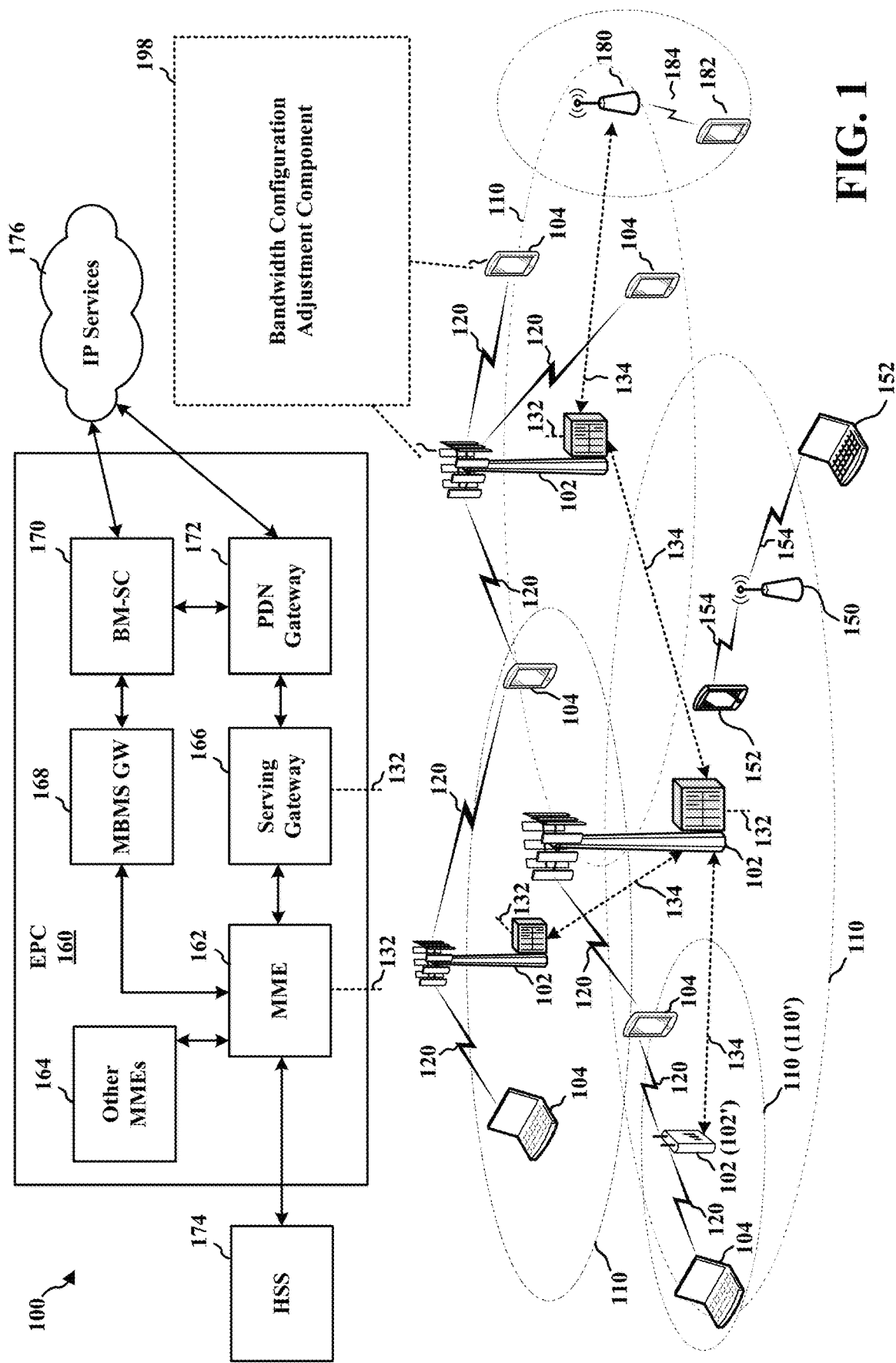
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 or base station 102, 180 may be configured to include a bandwidth configuration adjustment component (198) for dynamically adjusting a bandwidth of a UE or base station involved in narrowband communication, e.g., as described in connection with FIGS. 4, 5, 6, and 9. The bandwidth configuration adjustment component 198 may correspond to bandwidth configuration component 708, 1008.

Figure 2:
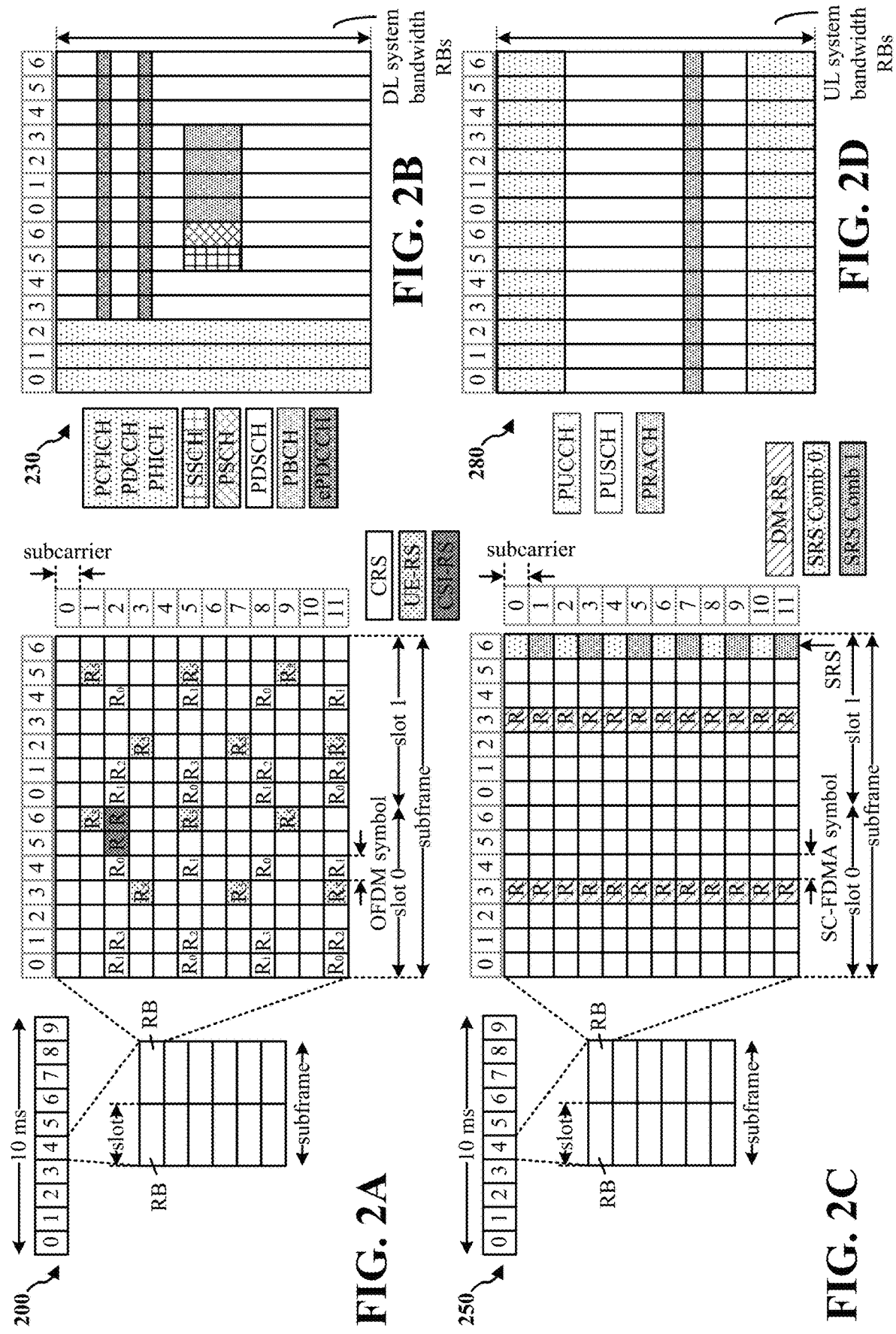
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
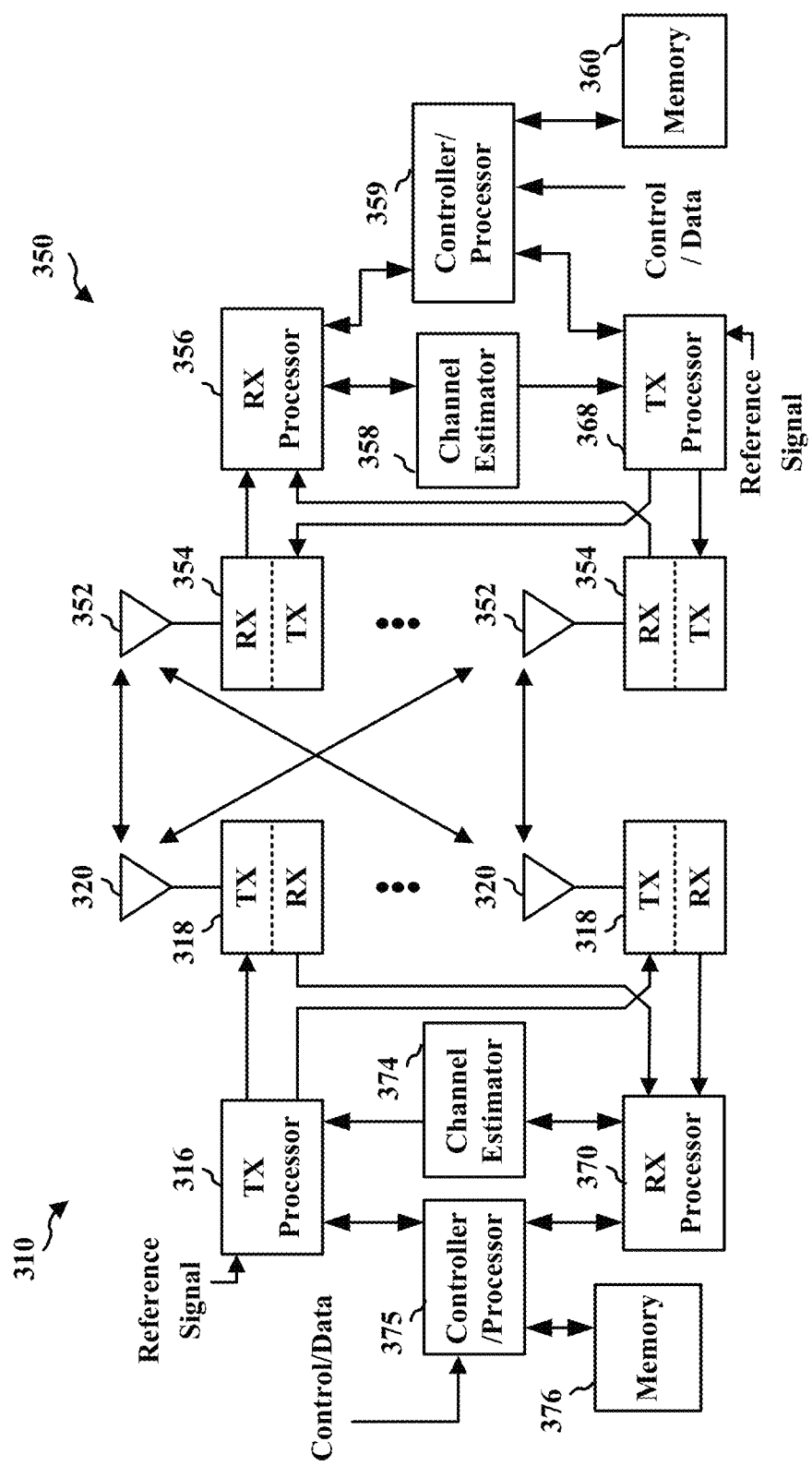
FIG. 3 is a diagram illustrating an example of an evolved Node B (eNB) and UE in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Narrowband wireless communication involves unique challenges due to the limited frequency dimension of the narrow band. One example of such narrowband wireless communication is NB-IoT, which is limited to a single RB of system bandwidth, e.g., 180 kHz. Another example of narrowband wireless communication is eMTC, which is limited to six RBs of system bandwidth.

Multiple users may utilize the narrow band. While only some of the UEs may be active at a particular time, the narrowband communication should support such multi-user capacity.

Additionally, narrowband communication may need to provide for deep coverage, by accounting for devices in environments requiring different Coverage Enhancement (CE) levels. For example, some devices may need as much as 20 dB of CE, which results in greater uplink Transmission Time Interval (TTI) bundling, further limiting time resources.

NB-IoT communication may also involve a large cell radius, e.g., as much as approximately 35 km. Thus, the communication may involve a long delay, such as 200 μs, which may employ a long Cyclic Prefix (CP) length.

Similar challenges are involved with narrowband communication using eMTC, e.g., with Category 0, low cost MTC UEs. An MTC UE may be implemented with reduced peak data rates (e.g., a maximum of 1000 bits for a transport block size). Further, an MTC UE may be limited to supporting rank 1 transmissions and/or having 1 receive antenna. When an MTC UE is half-duplex, the MTC UE may have a relaxed switching timing (switching from transmission to reception or reception to transmission) compared to legacy or non-MTC UEs in accordance with the LTE standards. For example, a non-MTC UE may have a switching time on the order of 20 microseconds, while an MTC UE may have a switching time on the order of 1 millisecond.

MTC UEs may monitor DL control channels in the same way as non-MTC UEs, e.g., monitoring wideband signals, monitoring for both PDCCH and EPDCCH, etc. Additional MTC enhancements may be supported. Although MTC UEs operate in a narrowband, the MTC UEs may also be capable of operation in a wider system bandwidth (e.g., 1.4/3/5/10/15/20 MHz). For example, the MTC UEs may work in a system bandwidth of 1.4 MHz and may use 6 resource blocks (RBs). Further, the MTC UEs may have enhanced coverage up to 15 dB.

In eMTC with extended coverage support, one or more channels may be bundled (e.g., repeated) in the time domain. In particular, bundled M-PDCCH may use multiple subframes for transmission. Resources for an M-PDCCH may be allocated by a base station in accordance with requirements for ePDCCH within the narrowband on which an MTC UE is operating.

Unified IoT-unlicensed (IoT-U) may involve a common design for wireless communication of different types of narrowband devices over a shared unlicensed band. For example, unified IoT-U may involve a common design for NB-IoT devices and for eMTC devices sharing a same unlicensed band.

Unified IoT-U may involve a similar design or configuration for different wireless communication bands, e.g., for a 1 GHz band and a 2.4 GHz band. Unified IoT-U may also include similar designs or configurations for different regions and/or countries. Unified IoT may be based on NB-IoT physical channels, e.g., including downlink sync channels.

In unified IoT-U, the same physical channels may be used to serve UEs of different bandwidth capabilities, e.g., UEs with a bandwidth capability of 6 RBs and UEs with a bandwidth capability of only 1 RB. Additionally, UEs with other bandwidth capabilities may also be served, e.g., UEs with an intermediate capability between 1 RB and 6 RBs or a bandwidth capability beyond 6 RBs, e.g., 10 RBs, 20 RBs, etc. For example, UEs having a bandwidth capability of 3 RBs or 5 RBs may be served along with UEs having a lower bandwidth capability of 1 RB and/or UEs with a higher bandwidth capability above 5 RBs.

Currently, the bandwidth for a UE is configured, e.g., from 1 RB to 6 RB, during cell acquisition, and the bandwidth processed by the UE cannot be changed dynamically. Timing relationships between the physical channels may be different for UEs capable of different bandwidths as well as for UEs with different processing capabilities. For example, NB-IoT communication may have more relaxed processing timelines, whereas eMTC-U communication may be enable communication to be processed more quickly. Different timing relationships may need to be realized in a given TDD frame structure.

Unified IoT-U may involve common upper layer procedures, e.g., including core network procedures.

In Unified IoT-U, some applications may be supported conditionally. Examples of such applications may include mobility, positioning, or VoLTE, among others. For example, mobility may be supported only if the bandwidth meets a threshold, e.g. if the bandwidth is at least 5 RBs, and if a channel estimation (CE) level meets another threshold, if the CE level is greater than 32 repetitions. As another example, positioning may be supported if the bandwidth meets a threshold, e.g., if the bandwidth is as at least 3 RBs, etc. In another example, VoLTE may be supported if a CE level meets a threshold, e.g., if the CE level is equal to 1 or 2 and if the UE supports a turnaround time that meets another threshold.

It is important for narrowband UEs to be capable of low power operation, e.g., battery lifetime for a narrowband UE may be very important. Narrowband UEs may be low complexity UEs that are expected to perform different functions at different times. Such UEs might not be expected to perform multiple functions at the same time. It is desirable to provide ways to reduce the power consumption for such narrowband UEs for communication in a unified IoT-U system.

The present application provides a solution to this need by providing a dynamic bandwidth operation that dynamically adjusts the bandwidth configuration of a narrowband UE, which improves power consumption for the narrowband UE.

The dynamic bandwidth operation may be triggered by the base station, e.g., as described in connection with the example of FIG. 4, or by the UE itself, as in connection with the example of FIG. 5. The dynamic bandwidth operation may be based on a specific function performed by the UE, e.g., positioning, mobility, VoLTE, or RLM, SRS, random access, among others. The dynamic bandwidth operation may involve a smaller bandwidth configuration for receiving control transmissions and an increased bandwidth for receiving or transmitting data.

In yet another example, a base station may dynamically adjust the bandwidth that the base station uses for narrowband communication.

Figure 4:
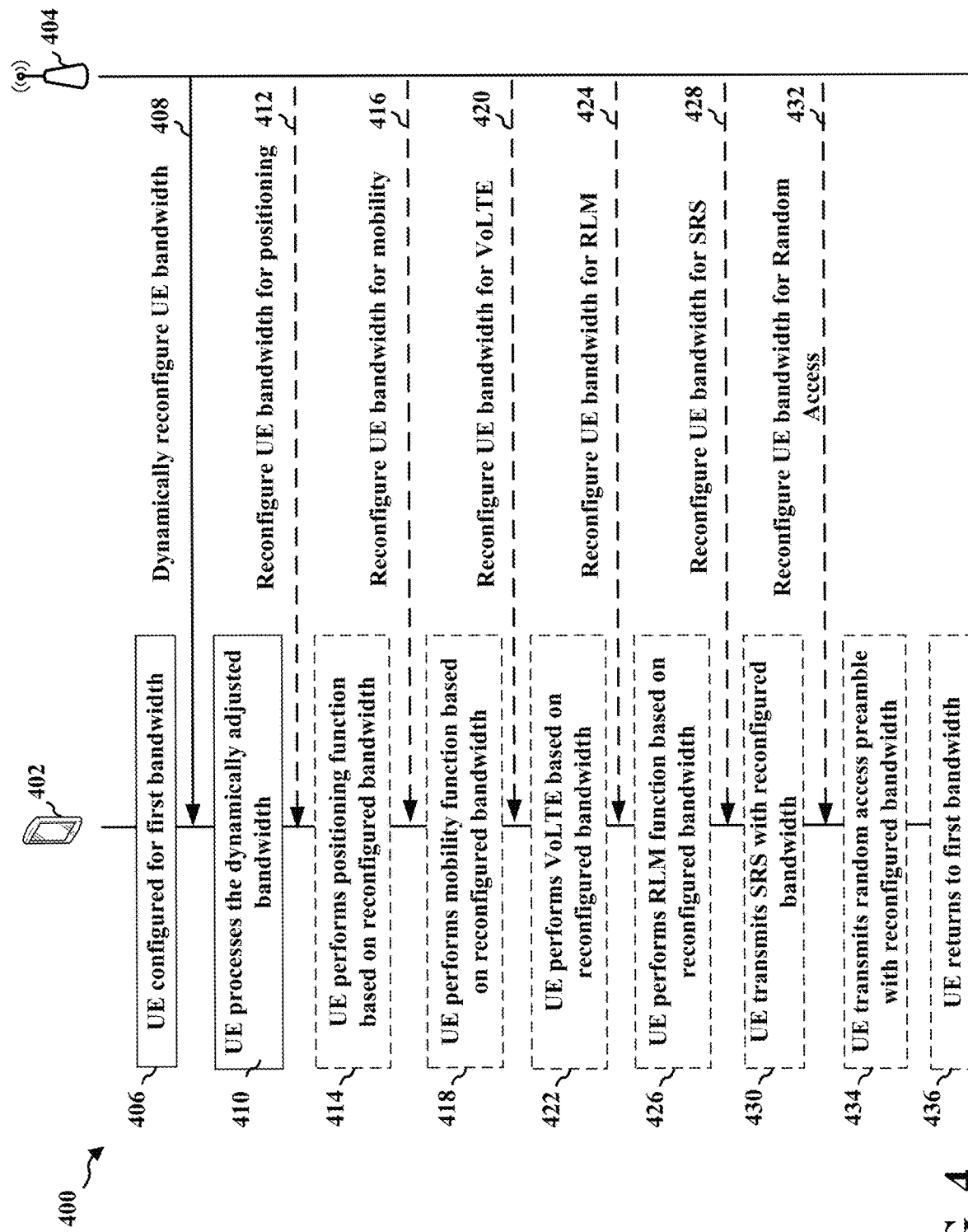
FIG. 4 is a diagram illustrating example communication between a base station and a UE.

FIG. 4 illustrates a diagram 400 of a narrowband UE 402 wirelessly communicating with a base station 404. The wireless communication may be based, e.g., on Unified-IoT-U. The UE 402 may be configured 406 with a first bandwidth for communication with base station 404. The base station may dynamically adjust 408 the bandwidth configuration of the UE. The UE 402 then processes at 410 the dynamically adjusted bandwidth in response to the reconfiguration 408.

As noted supra, narrowband UEs may be low complexity UEs that are expected to perform different functions at different times rather than performing multiple functions at the same time. Thus, a bandwidth configuration for the UE may be dynamically adjusted based on the function or application performed by the UE. This enables the UE to operate using a narrower bandwidth unless a function/application requires an increased bandwidth. This may provide reduced power consumption and/or improved function performance by the UE. FIG. 4 illustrates various examples of dynamic bandwidth reconfiguration for example functions/applications. Optional aspects of FIG. 4 are illustrated using a dashed line.

Positioning

In a first example, a base station may dynamically configure a UE with an increased bandwidth to be used for measurement in connection with a positioning function at 412. For example, a single RB may lead to poor measurement accuracy The higher bandwidth may allow for more accurate measurements. The UE may use the dynamic configuration to use an increased bandwidth when performing measurements for the positioning function/application at 414. When the UE is not performing measurements for the positioning function/application, the UE may use a reduced bandwidth. For example, a UE may be configured with a 1 RB bandwidth and through the dynamic configuration from the base station, the UE may use an increased bandwidth for performing positioning measurements. This reduces power consumption at the UE while enabling the UE to performing the positioning function, by configuring the UE to use the increased bandwidth necessary to perform accurate measurements for the positioning function and to use a reduced bandwidth at other times.

A UE may also need to measure cells which are very far away and whose contribution to positioning accuracy may be smaller. The base station may configure the measurement bandwidth of neighbor cells to be different than a measurement bandwidth for the serving cell. The different measurement bandwidth for the neighbor cells may be based on any of a UE bandwidth capability, a relative distance to the serving base station, a relative distance to at least one neighbor cell, the particular positioning application employed by the UE, or whether LBT is used at the base station, etc. For example, if LBT is used at the base station, a one shot measurement may be better, because the UE needs to check LBT clearance for neighbor cells.

Some positioning applications may have a coarse location requirement, and other applications may need very fine tracking. Therefore, the base station may configure the UE with different bandwidth configurations depending on demands of the particular positioning application. For example, the base station may configure the UE with an increased bandwidth for performing a first positioning application and may configure the UE with a different increased bandwidth for performing a second positioning application. The different bandwidths may be selected by the base station to meet the demands of the particular positioning application.

Thus, the adjusted bandwidth configuration may be based on an intended accuracy of the positioning measurement, e.g., the bandwidth configuration may be a function of the desired accuracy for the positioning measurement. In another example, the adjusted bandwidth configuration may be based at least one Radio Resource Management (RRM) measurement reported by the user equipment for a serving cell or a neighbor cell. For example, the bandwidth configuration may depend on any of RSRP, RSRQ, RSSI, etc. reported by the UE. A different bandwidth may be configured for each cell that is being measured by the UE.

Mobility

In a second example, the base station may dynamically configure the UE with different bandwidths for different cells, e.g., in connection with a mobility function at 416. The UE then adjusts its bandwidth for mobility processing at 418 according to the reconfiguration 416. For example, an increased bandwidth may be beneficial for a serving cell in order to maintain good estimates of RSRP, etc. However, the UE may be configured to use a decreased bandwidth to save power when performing neighbor cell measurements. The bandwidth configuration may also be a function of the measured RSRP. For example, when the UE measures an RSRP for the serving cell above a threshold, the UE may be configured to use a single RB to measure neighbor cells, because there is a low chance of handover or cell reselection. Once the measured RSRP for the serving cell falls below the threshold, the UE may be configured to increase the bandwidth for the neighbor cell measurements to improve measurement accuracy, e.g., because the reduced RSRP indicates a higher likelihood of a handover/cell reselection.

VoLTE

VoLTE is not feasible with using only 1 RB, as with NB-IoT. However, VoLTE may be performed using a narrowband with an increased bandwidth, such as with the 6 RBs of eMTC. Therefore, in another example, the base station may configure a UE with an increased bandwidth to perform VoLTE at 420. The UE then adjusts its bandwidth for VoLTE processing at 422 according to the reconfiguration 418. The dynamic adjustment of the bandwidth configuration for the UE 402 may be in response to a UE or a network request for a VoLTE call. The base station may respond to the request by configuring the UE to process an increased bandwidth for the VoLTE call to enable faster processing for better turnaround times. For example, the bandwidth may be configured to ensure a better quality of service for performing VoLTE, e.g., in comparison to non-VoLTE functions.

Radio Link Measurement

In another example, the adjusted bandwidth configuration may be for performing RLM. An RLM procedure may be performed to infer a radio link quality based on measurements of reference signals. In one example, RLM may include inferring a radio link quality for a hypothetical PDCCH, e.g., based on measurements of a different, quasi-co-located (QCL) reference signal using static parameters. The UE may be able to infer parameters of the channel (such as delay spread, Doppler, etc.), by observing the channel over which SS port set is transmitted. An out-of-sync determination may be made when a measurement, such as a block error rate or a Signal to Interference plus Noise Ratio (SINR), is below a threshold. The UE may declare a radio link failure (RLF), e.g., when multiple out-of-sync determinations are made for a specified time interval, e.g., a 200 ms time interval.

A limited number of RBs, such as 1 RB, may not be accurate for computing RLM measurements, e.g., PDCCH SINR, RSRP, etc. Therefore, the base station may dynamically adjust a bandwidth configuration of the UE for performing RLM at 424. For example, the base station may configure the UE to use an increased bandwidth for performing RLM when a UE is close to declaring RLF. The increased bandwidth may be used to improve the accuracy of the RLM measurements, e.g., PDCCH SINR or RSRP measurement, to avoid temporary fades and false RLF declaration in a low mobility environment. The UE adjusts its bandwidth for RLM processing at 426 according to the reconfiguration 424. It may be undesirable to have an handover occur when a more accurate measurement would avoid the RLF. For example, when a UE has determined that the RLM measurement is below a threshold for a specified number of times, prior to declaring RLF, the UE may increase the bandwidth for processing the RLM measurements. The increase may be made incrementally, if the UE continues to determine an RLM measurement below the threshold, e.g., expanding the bandwidth incrementally up to the whole bandwidth capability of the UE.

As another example, the UE may apply a different bandwidth configuration for SRS transmission. Thus, at 428, the base station may indicate a bandwidth reconfiguration for transmission of SRS. Then, at 430, the UE may apply the reconfigured bandwidth to transmit SRS.

As another example, the base station may reconfigure the bandwidth of the UE for random access. For example, the base station may indicate a bandwidth configuration to the UE for use in random access at 432. Then, at 434, the UE may apply the bandwidth configuration to transmit a random access preamble. The bandwidth configuration may be based on a desired resolution for timing advance correction.

As illustrated at 436, the UE may return to processing the first bandwidth, e.g., after performing the corresponding function or when another basis for the adjusted bandwidth is not met.

A UE may be dynamically configured with a bandwidth for data processing. FIG. 5 illustrates a diagram 500 of a narrowband UE 502 wirelessly communication with a base station 504. For example, a UE may reconfigure its digital or RF bandwidth in order to support a higher number of RBs, and thus a higher data rate, when needed for receiving a downlink data transmission, e.g., PDSCH, or for transmitting an uplink data transmission, e.g., PUSCH. As in FIG. 5, UE 502 may be configured 506 for processing a first bandwidth. The UE 502 may receive a control transmission 508 based on the first bandwidth, and the control transmission 508 may indicate a data transmission on an increased bandwidth, the data transmission being either downlink or uplink. For example, a UE may receive PDCCH on only a single RB, and therefore may only be monitoring a single RB. The received PDCCH on the single RB may indicate a PDSCH/PUSCH transmission on multiple RBs. In this example, in the time between receiving the PDCCH and before the start of the PDSCH/PUSCH, the UE may reconfigure 510 its digital or RF bandwidth to support the higher number of RBs indicated in the PDCCH for the PDSCH/PUSCH. The UE 502 may then receive a PDSCH 512 based on the increased bandwidth or may transmit PUSCH 514 based on the increased bandwidth. After the PDSCH/PUSCH, the UE may return 516 to processing with the reduced bandwidth, e.g., to the first bandwidth. As with the PDCCH 508, the UE may receive another PDCCH 518 based on the reduced bandwidth. If the PDCCH 518 indicates an increased bandwidth for a data transmission, the UE may once again reconfigure its bandwidth to support the increased bandwidth. In another example, the PDCCH may not indicate an increase bandwidth for the PDSCH/PUSCH. In this example, the UE may refrain from increasing its bandwidth configuration and may continue to use the reduced bandwidth to process PDSCH/PUSCH.

Additionally, a base station may dynamically configure the bandwidth used by the base station for communicating with at least one narrowband UE. In an unlicensed spectrum environment, a reduction in interference can be important. A base station may concentrate its transmission power in a smaller bandwidth in order to improve the range of the base station, and which may reduce interference to other base stations.

For example, a base station may generally operate in a 1 RB system. 1 RB is only one example, and the base station may operate using a different minimum configured bandwidth. However, based on dynamically changing communication needs, the base station may dynamically adjust to using an increased bandwidth. The use of an increased bandwidth may reduce the range of the base station, but may improve the capacity of the base station and the accuracy of measurements. The UEs served by the base station may monitor only the minimum configured bandwidth, e.g., 1 RB, as is used in the general operation of the system. Therefore, the increased bandwidth at the base station may increase the bandwidth in order to serve a larger number of UEs, a particular group of UEs, or a particular application at a UE. Thus, the base station may dynamically increase or decrease the bandwidth used for base station transmissions based on at least one of an application, a UE, or a group of UEs.

Figure 5:
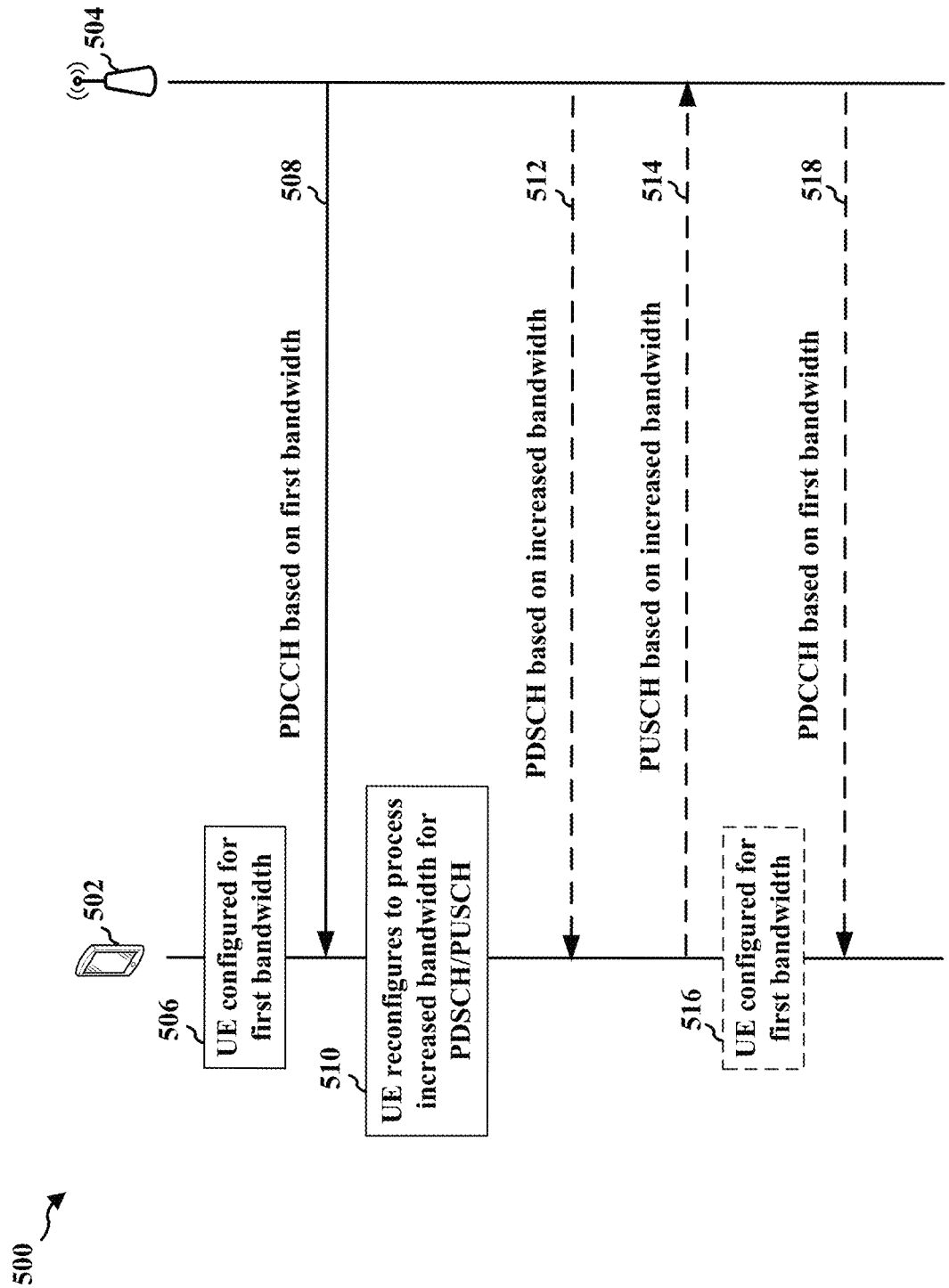
FIG. 5 is a diagram illustrating example communication between a base station and a UE.
Figure 6:
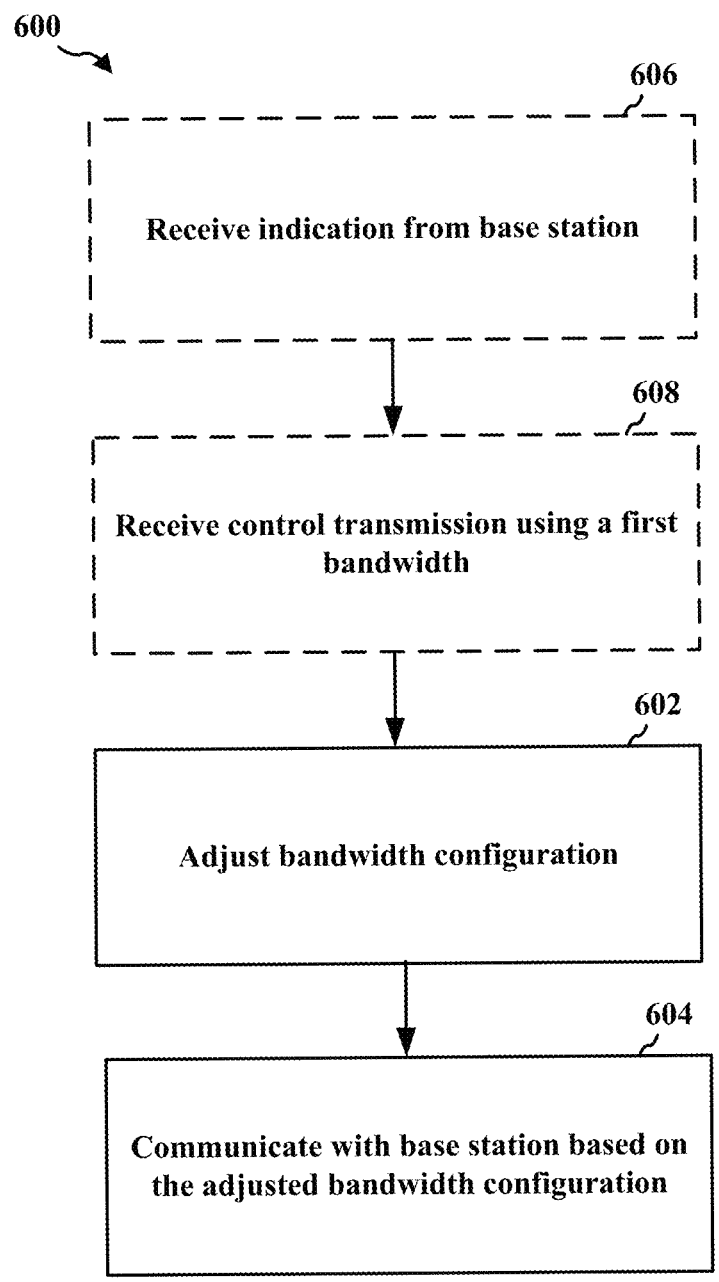
FIG. 6 is a flowchart of a method of wireless communication.

FIG. 6 is a flowchart 600 of a method of wireless communication. The method may be performed by a UE (e.g., UE 104, 350, 402, 502, 1050, the apparatus 702, 702') wirelessly communicating with a base station (e.g., base station 102, 180, 310, 404, 504, 750, the apparatus 1002, 1002'). The UE may be a narrowband UE, e.g., an NB-IoT UE or eMTC UE. Thus, the wireless communication may comprise NB-IoT communication, eMTC communication, and/or unified IoT-U communication. At 602, the UE adjusts a bandwidth configuration of the UE. The UE may adjust its bandwidth configuration, e.g., as described in connection with FIGS. 4 and 5. For example, the UE may dynamically adjust the bandwidth configuration.

At 604, the UE communicates with a base station based on the adjusted bandwidth configuration. For example, the UE may process communication received from the base station according to the adjusted bandwidth configuration. In another example, the UE may process communication for transmission to the base station according to the adjusted bandwidth configuration.

The UE may adjusts its bandwidth configuration at 602 in response to an indication from a base station, described in connection with FIG. 4. Therefore, at 606, the UE may receive an indication from the base station, wherein the bandwidth configuration of the UE is adjusted at 602 based on the indication received from the base station.

The bandwidth configuration may be d adjusted based on a function performed by the UE.

The function may comprise a positioning function. In this example, adjusting the bandwidth configuration may include increasing the bandwidth configuration used for a measurement associated with the positioning function. The adjusted bandwidth configuration may be based on an intended accuracy of the positioning measurement, e.g., the bandwidth configuration may be a function of the desired accuracy for the positioning measurement. The adjusted bandwidth configuration may be based at least one Radio Resource Management (RRM) measurement reported by the user equipment for a serving cell or a neighbor cell. For example, the bandwidth configuration may depend on any of RSRP, RSRQ, RSSI, etc. reported by the UE. A different bandwidth may be configured for each cell that is being measured by the UE.

The function may comprise a mobility function. In this example, the adjusted bandwidth configuration may include a first bandwidth configuration for a first measurement associated with a serving cell and a second bandwidth configuration for a second measurement associated with a neighbor cell. Thus, different bandwidth configurations may be used for measurements associated with a serving cell and measurements associated with a neighbor cell. For example, an increased bandwidth configuration may be used for serving cell measurements in comparison to the bandwidth configuration for neighbor cell measurement.

The function may comprise a VoLTE function. In this example, adjusting the bandwidth configuration may include increasing the bandwidth configuration for performing VoLTE. In another example, the bandwidth may be configured to ensure a better quality of service for performing VoLTE, e.g., in comparison to non-VoLTE functions.

The function may comprise RLM. In this example, adjusting the bandwidth configuration may include increasing the bandwidth configuration for RLM measurements prior to declaring a radio link failure.

In another example, the function may comprise transmission of an SRS, and the bandwidth may be dynamically configured for transmission of the SRS.

In another example, the function may comprise random access. For example, a bandwidth may be dynamically selected for transmission of a random access preamble, e.g., based on a desired resolution for timing advance correction.

The UE may use a first bandwidth for performing the function and a second bandwidth for performing a different function.

In another example, the bandwidth configuration may be adjusted based on a reconfiguration determined at the UE, e.g., as described in connection with FIG. 5. The reconfiguration may be based on any of an RRC reconfiguration, a MAC control element based reconfiguration, or a reconfiguration based on a DCI grant. For example, the UE may receive, using a first bandwidth, a control transmission at 608 indicating a communication associated with a second bandwidth, wherein the second bandwidth is larger than the first bandwidth. The communication associated with the second bandwidth may comprise a data transmission, e.g., PDSCH/PUSCH, and the control transmission may comprise PDCCH. In this example, adjusting the bandwidth configuration may include increasing the bandwidth configuration from the first bandwidth to the second bandwidth in response to the control transmission.

Figure 7:
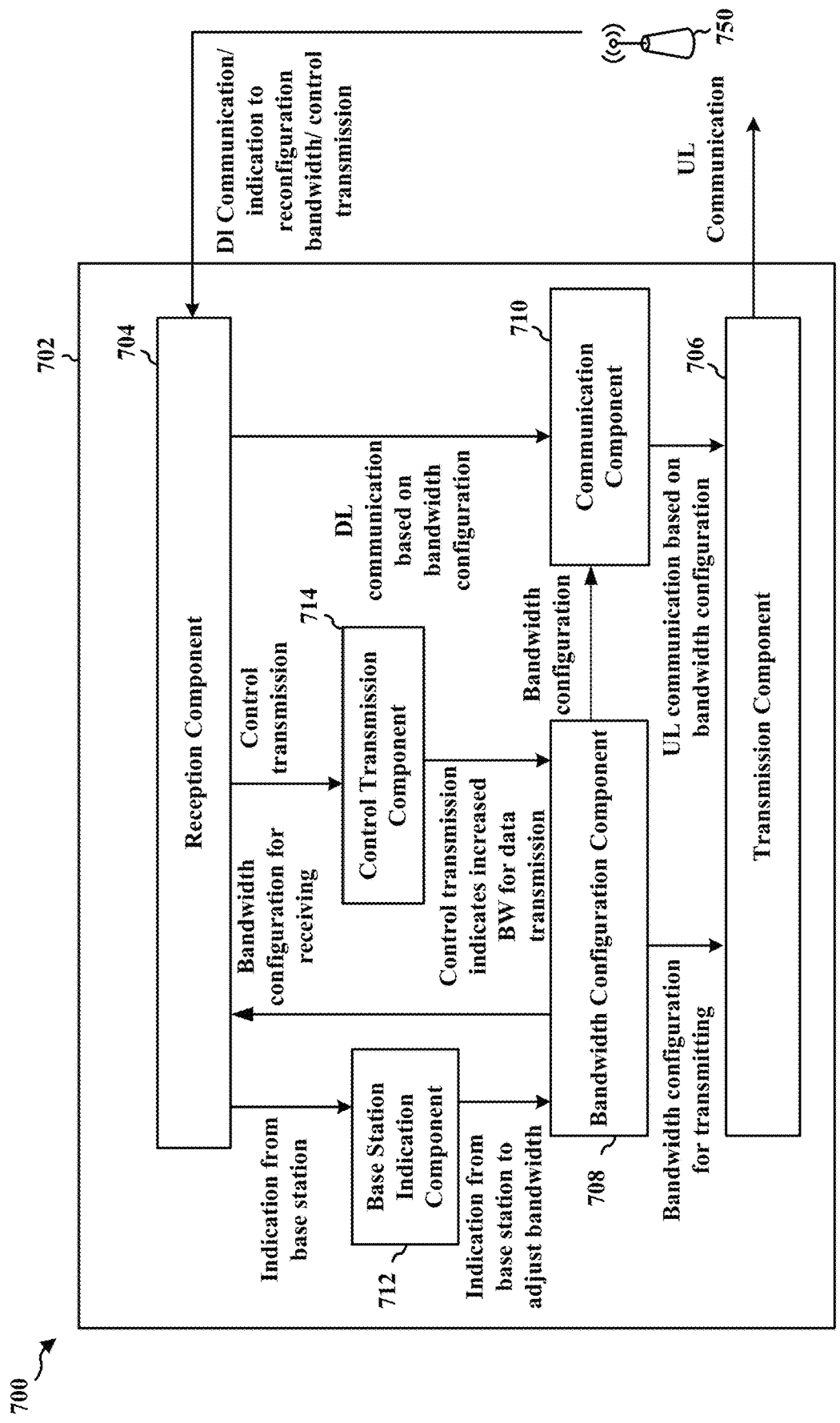
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a UE (e.g., UE 104, 350, 402, 502, 1050) wirelessly communicating with base station 750 (e.g., base station 102, 180, 310, 404, 504, the apparatus 1002, 1002'). The apparatus includes a reception component 704 that receives DL communication from the base station 750 and a transmission component 706 that transmits UL communication to the base station 750. The apparatus 702 may comprise a narrowband apparatus that communicates with base station 750 using a narrowband, e.g., using a single RB, six RBs, an intermediate number of RBs, etc.

The apparatus 702 may include a bandwidth configuration component 708 configured to adjust a bandwidth configuration of the UE, e.g., to dynamically adjust the bandwidth configuration, and a communication component 710 configured to communicate with a base station based on the adjusted bandwidth configuration. The communication may involve, e.g., downlink and/or uplink communication with base station 750.

The apparatus may include a base station indication component 712 configured to receive an indication from the base station. The base station indication component 712 may provide the indication to the bandwidth configuration component 708, and the bandwidth configuration of the UE may adjusted based on the indication received from the base station.

The apparatus may include a control transmission component 714 configured to receive, using a first bandwidth, a control transmission indicating a communication associated with a second bandwidth, wherein the second bandwidth is larger than the first bandwidth. The communication associated with the second bandwidth may comprise a data transmission, e.g., PDSCH/PUSCH. The control transmission component 714 may provide information regarding the indication in the control transmission to the bandwidth configuration component 708, and the bandwidth configuration of the UE may be adjusted to increase the bandwidth configuration from the first bandwidth to the second bandwidth in response to the control transmission.

The apparatus may include additional components that perform each of the blocks of the algorithm in the aforementioned flowchart of FIG. 6 and the aspects described in connection with FIGS. 4 and 5. As such, each block in the aforementioned flowchart of FIG. 6 and the aspects described in connection with FIGS. 4 and 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
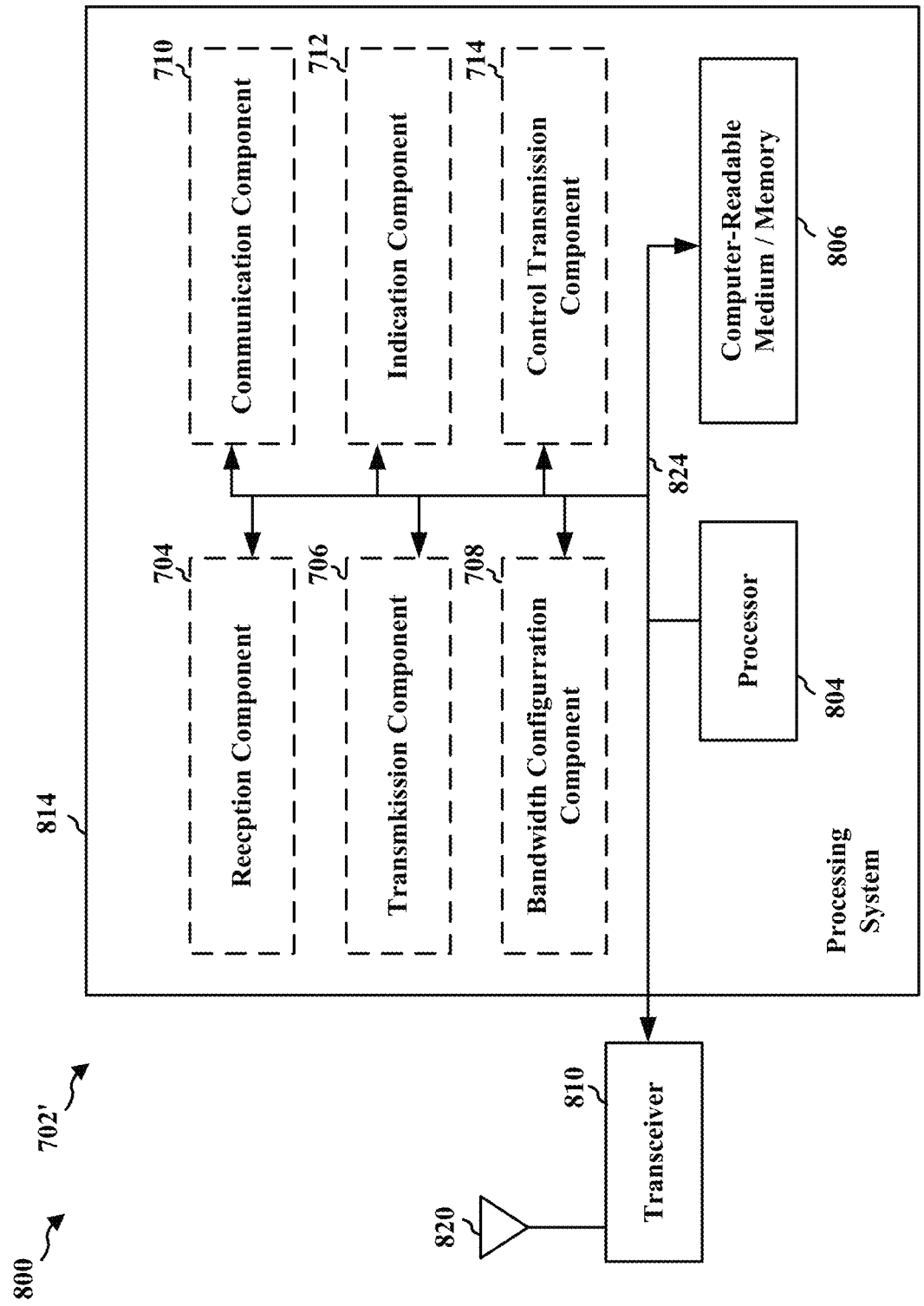
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359.

In one configuration, the apparatus 702/702' for wireless communication includes means for adjusting a bandwidth configuration of the UE, means for communicating with a base station based on the adjusted bandwidth configuration, means for receiving an indication from the base station, and means for receiving, using a first bandwidth, a control transmission indicating a communication associated with a second bandwidth. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
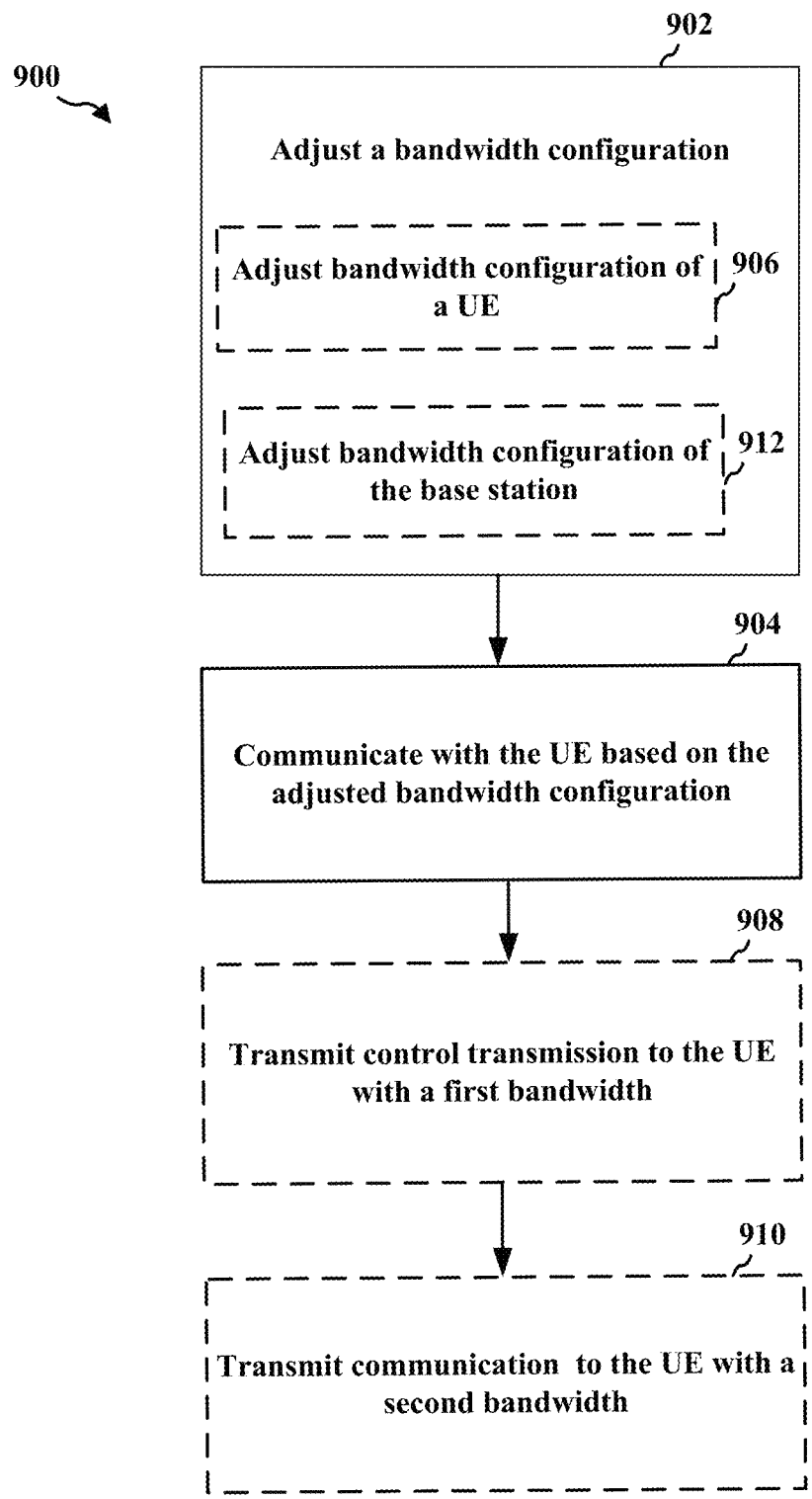
FIG. 9 is a flowchart of a method of wireless communication.

FIG. 9 is a flowchart 900 of a method of wireless communication. The method may be performed by a base station (e.g., the base station 102, 180, 310, 404, 504, 750, the apparatus 1002, 1002') wirelessly communicating with a UE (e.g., the UE 104, 350, 402, 502, 1050, the apparatus 702, 702'). The wireless communication may comprise narrowband communication, e.g., NB-IoT communication and/or eMTC communication. Thus, the wireless communication may comprise NB-IoT communication, eMTC communication, and/or unified IoT-U communication. At 902, the base station adjusts a bandwidth configuration of at least one of a UE, e.g., at 906, or the base station, e.g., at 912. Aspects of such adjustment of a bandwidth for communication between a UE and base station are described in connection with the examples of FIGS. 4 and 5. The adjustment of the bandwidth configuration may comprise a dynamic adjustment of the bandwidth configuration.

At 904, the base station communicates with the UE according to the adjusted bandwidth configuration at 902. The communication may comprise uplink or downlink communication.

The base station may adjust a bandwidth configuration of the UE at 906 based on a function performed by the UE. The function may comprise a positioning function. In this example, adjusting the bandwidth configuration of the UE may include increasing the bandwidth configuration used for a measurement associated with the positioning function. The adjusted bandwidth configuration may be based on an intended accuracy of the positioning measurement, e.g., the bandwidth configuration may be a function of the desired accuracy for the positioning measurement. The adjusted bandwidth configuration may be based at least one Radio Resource Management (RRM) measurement reported by the user equipment for a serving cell or a neighbor cell. For example, the bandwidth configuration may depend on any of RSRP, RSRQ, RSSI, etc. reported by the UE. A different bandwidth may be configured for each cell that is being measured by the UE.

The function may comprise a mobility function. In this example, the adjusted bandwidth configuration of the UE may include a first bandwidth configuration for a first measurement associated with a serving cell and a second bandwidth configuration for a second measurement associated with a neighbor cell. Thus, different bandwidth configurations may be used for measurements associated with a serving cell and measurements associated with a neighbor cell. For example, an increased bandwidth configuration may be used for serving cell measurements in comparison to the bandwidth configuration for neighbor cell measurement.

The function may comprise a VoLTE function. In this example, adjusting the bandwidth configuration of the UE may include increasing the bandwidth configuration for performing VoLTE. In another example, the bandwidth may be configured to ensure a better quality of service for performing VoLTE, e.g., in comparison to non-VoLTE functions.

The function may comprise RLM. In this example, adjusting the bandwidth configuration of the UE may include increasing the bandwidth configuration for RLM measurements prior to declaring a radio link failure.

In another example, the function may comprise transmission of an SRS, and the bandwidth may be dynamically configured for transmission of the SRS.

In another example, the function may comprise random access. For example, a bandwidth may be dynamically selected for transmission of a random access preamble, e.g., based on a desired resolution for timing advance correction.

The bandwidth configuration adjusted at 906 may include a first bandwidth for the UE to perform the function and a second bandwidth for the UE to perform a different function.

At 908, the base station may transmit, using a first bandwidth, a control transmission to the UE indicating a communication associated with a second bandwidth, wherein the second bandwidth is larger than the first bandwidth. Then, at 910, the base station may transmit the communication to the UE using the second bandwidth. The control transmission may comprise, e.g., a 1 RB PDCCH, and the communication may comprise a data transmission with multiple RBs, e.g., a multiple RB PDSCH/PUSCH.

The base station may adjust the bandwidth configuration of the base station at 912. adjusting the bandwidth configuration of the base station at 912 may include increasing a transmission bandwidth of the base station in response to at least one of need for an increase in capacity, a need for improved accuracy of measurements, an application of the communication, or a group of UEs served by the base station.

Figure 10:
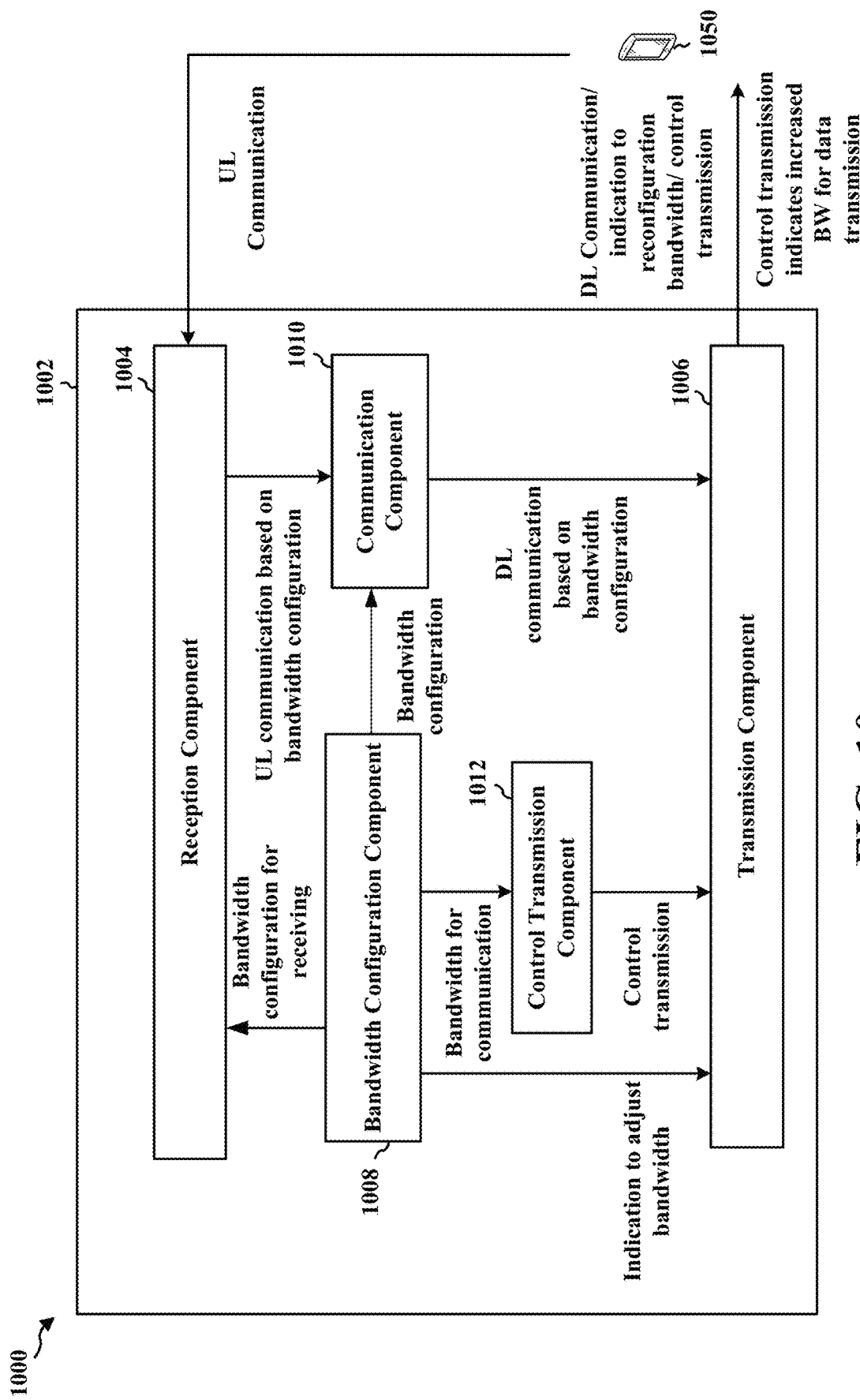
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a base station (e.g., the base station 102, 180, 310, 404, 504, 750) wirelessly communicating with UE 1050 (e.g., the UE 104, 350, 402, 502, the apparatus 702, 702'). The wireless communication may comprise narrowband communication, e.g., NB-IoT communication and/or eMTC communication. The apparatus includes a reception component 1004 that receives uplink communication from UE 1050 and a transmission component 1006 that transmits downlink communication with UE 1050.

The apparatus 1002 may include a bandwidth configuration component 1008 configured to adjust a bandwidth configuration of at least one of a UE or the base station, and a communication component 1010 configured to communicate with the UE according to the adjusted bandwidth configuration. The apparatus 1002 may include a control transmission component 1012 configured to transmit, using a first bandwidth, a control transmission to the UE indicating a communication associated with a second bandwidth, wherein the second bandwidth is larger than the first bandwidth. The communication component 1010 may then transmit the communication to the UE using the second bandwidth.

The apparatus may include additional components that perform each of the blocks of the algorithm in the aforementioned flowchart of FIG. 9 and the aspects of FIGS. 4 and 5. As such, each block in the aforementioned flowchart of FIG. 9 and the aspects of FIGS. 4 and 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
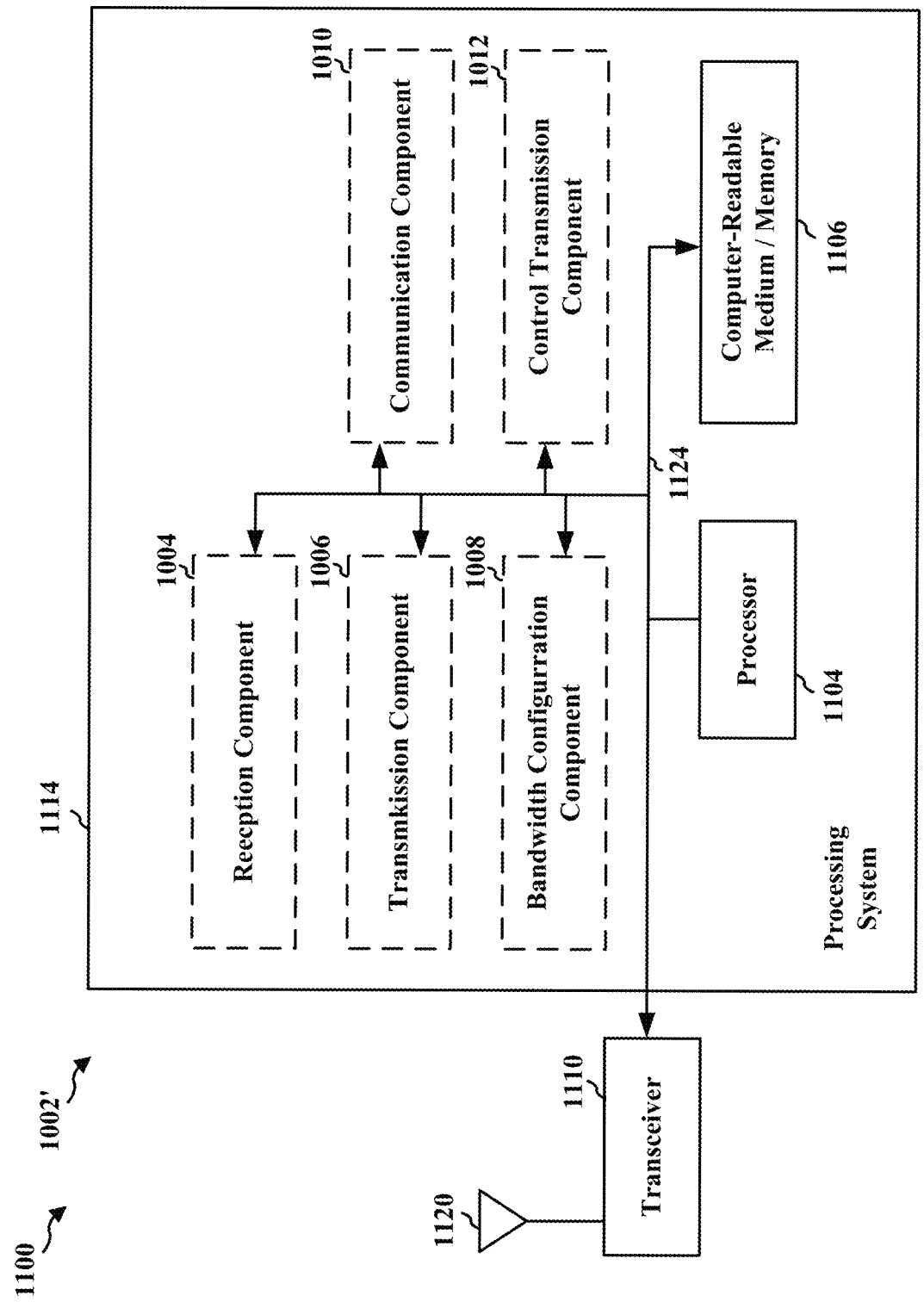
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the eNB 310 and may include the memory 376 and/or at least one of the TX processor 316, the RX processor 370, and the controller/processor 375

In one configuration, the apparatus 1002/1002' for wireless communication includes means for adjusting a bandwidth configuration of at least one of a UE or the base station, means for adjusting a bandwidth configuration of a UE, means for adjusting a bandwidth configuration of a base station, means for communicating with the UE according to the adjusted bandwidth configuration, means for transmitting, using a first bandwidth, a control transmission to the UE indicating a communication associated with a second bandwidth, wherein the second bandwidth is larger than the first bandwidth, and means for transmitting the communication to the UE using the second bandwidth. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    adjusting a bandwidth configuration of the UE for wireless communication with a base station, wherein the bandwidth configuration is increased for the UE to perform a positioning function to determine a position of the UE; and
    performing the positioning function using the increased bandwidth configuration, wherein performing the positioning function comprises performing a measurement associated with the positioning function using the increased bandwidth configuration.

2. The method of claim 1, wherein the bandwidth configuration is dynamically adjusted by the UE.

3. The method of claim 1, further comprising:
    receiving an indication from the base station, wherein the bandwidth configuration of the UE is adjusted based on the indication received from the base station.

4. The method of claim 1, wherein the adjusted bandwidth configuration is based on an intended accuracy of the measurement associated with the positioning function.

5. The method of claim 1, wherein the bandwidth configuration is adjusted for the UE to perform a radio resource management (RRM) measurement for a serving cell or a neighbor cell.

6. The method of claim 5, wherein the adjusted bandwidth configuration comprises a different bandwidth for each cell being measured.

7. The method of claim 1, wherein the bandwidth configuration is increased for the UE to perform a mobility function, and wherein the bandwidth configuration includes a first bandwidth configuration for a first measurement associated with a serving cell and a second bandwidth configuration for a second measurement associated with a neighbor cell.

8. The method of claim 1, wherein the bandwidth configuration is further adjusted for the UE to perform at least one of a voice over long term evolution (VoLTE) function or a transmission of a sounding reference signal (SRS), and wherein the adjusted bandwidth configuration includes an increased the bandwidth configuration for performing VoLTE or a bandwidth configuration for better quality of service for performing VoLTE, or wherein the adjusted bandwidth configuration is dynamically configured for the transmission of the SRS.

9. The method of claim 1, wherein the bandwidth configuration is further adjusted for the UE to perform a radio link monitoring (RLM) measurement, wherein adjusting the bandwidth configuration includes increasing the bandwidth configuration for the RLM measurements prior to declaring a radio link failure.

10. The method of claim 1, wherein the bandwidth configuration is increased for the UE to transmit a random access preamble, and wherein adjusting the bandwidth configuration includes selecting a bandwidth for transmission of the random access preamble based on a resolution for timing advance correction.

11. The method of claim 1, wherein the performing the positioning function, using the increased bandwidth configuration comprises:
performing a first function using a first bandwidth; and
performing a second function using a second bandwidth, wherein at least one of the first function or the second function comprises the positioning function.

12. The method of claim 1, wherein the bandwidth configuration is adjusted based on a reconfiguration determined at the UE.

13. The method of claim 12, further comprising:
receiving, using a first bandwidth, a control transmission indicating a communication associated with a second bandwidth, wherein the second bandwidth is larger than the first bandwidth,
wherein adjusting the bandwidth configuration includes increasing the bandwidth configuration from the first bandwidth to the second bandwidth in response to the control transmission.

14. An apparatus for wireless communication at a user equipment (UE), comprising:
a memory; and
at least one processor coupled to the memory and configured to:
adjust a bandwidth configuration of the UE for wireless communication with a base station, wherein the bandwidth configuration is increased for the UE to perform a positioning function to determine a position of the UE, wherein performing the positioning function comprises performing a measurement associated with the positioning function using the increased bandwidth configuration; and
communicate with a base station based on the adjusted bandwidth configuration.

15. A method of wireless communication at a base station, comprising:
adjusting a bandwidth configuration for wireless communication of at least one of a user equipment (UE), wherein the bandwidth configuration is increased for the UE to perform a measurement associated with a positioning function for the UE to determine a position of the UE; and
communicating with the UE according to the adjusted bandwidth configuration.

16. The method of claim 15, wherein the adjusted bandwidth configuration is based on an intended accuracy of the measurement associated with the positioning function.

17. The method of claim 15, wherein the bandwidth configuration is further adjusted for the UE to perform a radio resource measurement (RRM) measurement for a serving cell or a neighbor cell.

18. The method of claim 15, wherein the bandwidth configuration is increased for the UE to perform a mobility function, and wherein the bandwidth configuration of the UE includes a first bandwidth configuration for a first measurement associated with a serving cell and a second bandwidth configuration for a second measurement associated with a neighbor cell.

19. The method of claim 15, wherein the bandwidth configuration is further adjusted for the UE to perform a voice over long term evolution (VoLTE) function, and wherein the adjusted bandwidth configuration of the UE includes an increased bandwidth configuration used by the UE for performing VoLTE or a bandwidth configuration for better quality of service for performing VoLTE.

20. The method of claim 15, the bandwidth configuration is increased for the transmission of an SRS, and wherein the base station adjusts the bandwidth configuration of the UE.

21. The method of claim 15, wherein the bandwidth configuration is increased for the transmission of a random access preamble, and wherein adjusting the bandwidth configuration for the wireless communication of the at least one of the UE comprises selecting a bandwidth for transmission of the random access preamble based on a resolution for timing advance correction.

22. The method of claim 15, wherein the bandwidth configuration is further adjusted for the UE to perform a radio link measurement (RLM), wherein adjusting the bandwidth configuration of the UE includes increasing the bandwidth configuration for RLM measurements prior to declaring a radio link failure.

23. The method of claim 15, wherein the bandwidth configuration includes a first bandwidth for the UE to perform a first function and a second bandwidth for the UE to perform a second function, and at least one of the first function or the second function comprises the positioning function.

24. The method of claim 15, further comprising:
transmitting, using a first bandwidth, a control transmission to the UE indicating a communication associated with a second bandwidth, wherein the second bandwidth is larger than the first bandwidth; and
transmitting the communication to the UE using the second bandwidth.

25. The method of claim 15, wherein the base station adjusts the bandwidth configuration of the base station.

26. The method of claim 25, wherein adjusting the bandwidth configuration of the base station includes increasing a transmission bandwidth of the base station in response to at least one of:
a need for an increase in capacity;
a need for improved accuracy of measurements;
an application of the communication; or
a group of UEs served by the base station.

27. An apparatus for wireless communication at a base station, comprising:
a memory; and
at least one processor coupled to the memory and configured to:
adjust a bandwidth configuration for wireless communication of at least one of a user equipment (UE), wherein the bandwidth configuration is increased for the UE to perform a measurement associated with a positioning function to determine a position of the UE; and
communicate with the UE according to the adjusted bandwidth configuration.

28. The method of claim 1, wherein the positioning function is associated with at least one of UE mobility or a random access channel (RACH) procedure.

29. The apparatus of claim 14, wherein the bandwidth configuration is dynamically adjusted by the UE.

30. The apparatus of claim 14, wherein the adjusted bandwidth configuration is based on an intended accuracy of the measurement associated with the positioning function.

31. The apparatus of claim 14, wherein the processor is further configured to:
receive an indication from the base station, wherein the bandwidth configuration of the UE is adjusted based on the indication received from the base station.

32. The apparatus of claim 14, wherein the bandwidth configuration is adjusted based on a reconfiguration determined at the UE.

* * * * *